United States Patent [19]

Whittle

[11] Patent Number: 5,449,260
[45] Date of Patent: Sep. 12, 1995

[54] TAMPER-EVIDENT BOLT

[76] Inventor: Weldon M. Whittle, 4 Skylark Ct., Apt. 1, Baltimore, Md. 21234

[21] Appl. No.: 258,260

[22] Filed: Jun. 10, 1994

[51] Int. Cl.⁶ ............... F16B 19/00; F16B 23/00; F16B 35/06
[52] U.S. Cl. ................ 411/377; 411/404; 411/410; 411/911; 411/919
[58] Field of Search ............ 411/402, 403, 404, 410, 411/377, 373, 910, 911, 919

[56] References Cited

U.S. PATENT DOCUMENTS

| | | | |
|---|---|---|---|
| 2,375,249 | 5/1945 | Richer | 411/410 |
| 2,813,450 | 11/1957 | Dzus . | |
| 3,279,838 | 10/1966 | Hamilton | 411/910 X |
| 3,283,638 | 11/1966 | Ansingh . | |
| 3,298,272 | 1/1967 | Henderson | 411/910 X |
| 3,673,912 | 7/1972 | Herr | 411/410 X |
| 4,079,643 | 3/1978 | Evans . | |
| 5,098,239 | 3/1992 | Thiel | 411/377 |

FOREIGN PATENT DOCUMENTS 678839 9/1952 United Kingdom ............... 411/377

Primary Examiner—Neill R. Wilson
Attorney, Agent, or Firm—Leonard Bloom

[57] ABSTRACT

The invention herein disclosed involves a "tamper-evident bolt". More specifically, the bolt has ratchet or splined teeth on the outer periphery of the bolt head which will accept a socket for tightening the bolt. In the center of the head of the bolt is a sealed or capped blind axial recess. The recess is fitted to accept a driver to release the bolt. In a specific embodiment the blind axial recess has ratchet teeth. A seal or cap is received within the blind axial recess such that the seal or cap must be removed for access to the bolt releasing means, thereby indicating the possibility of unauthorized tampering with the bolt.

25 Claims, 5 Drawing Sheets

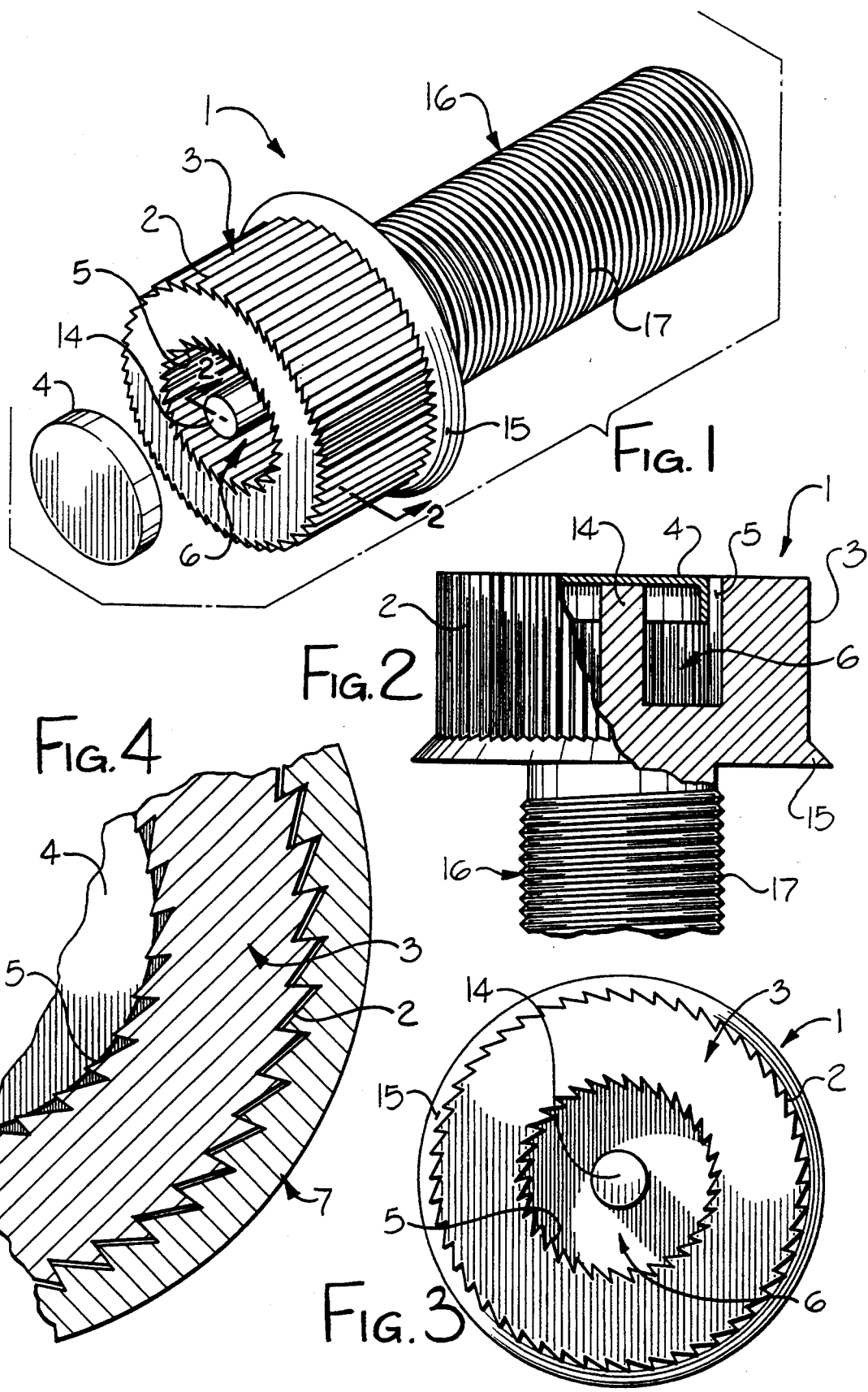

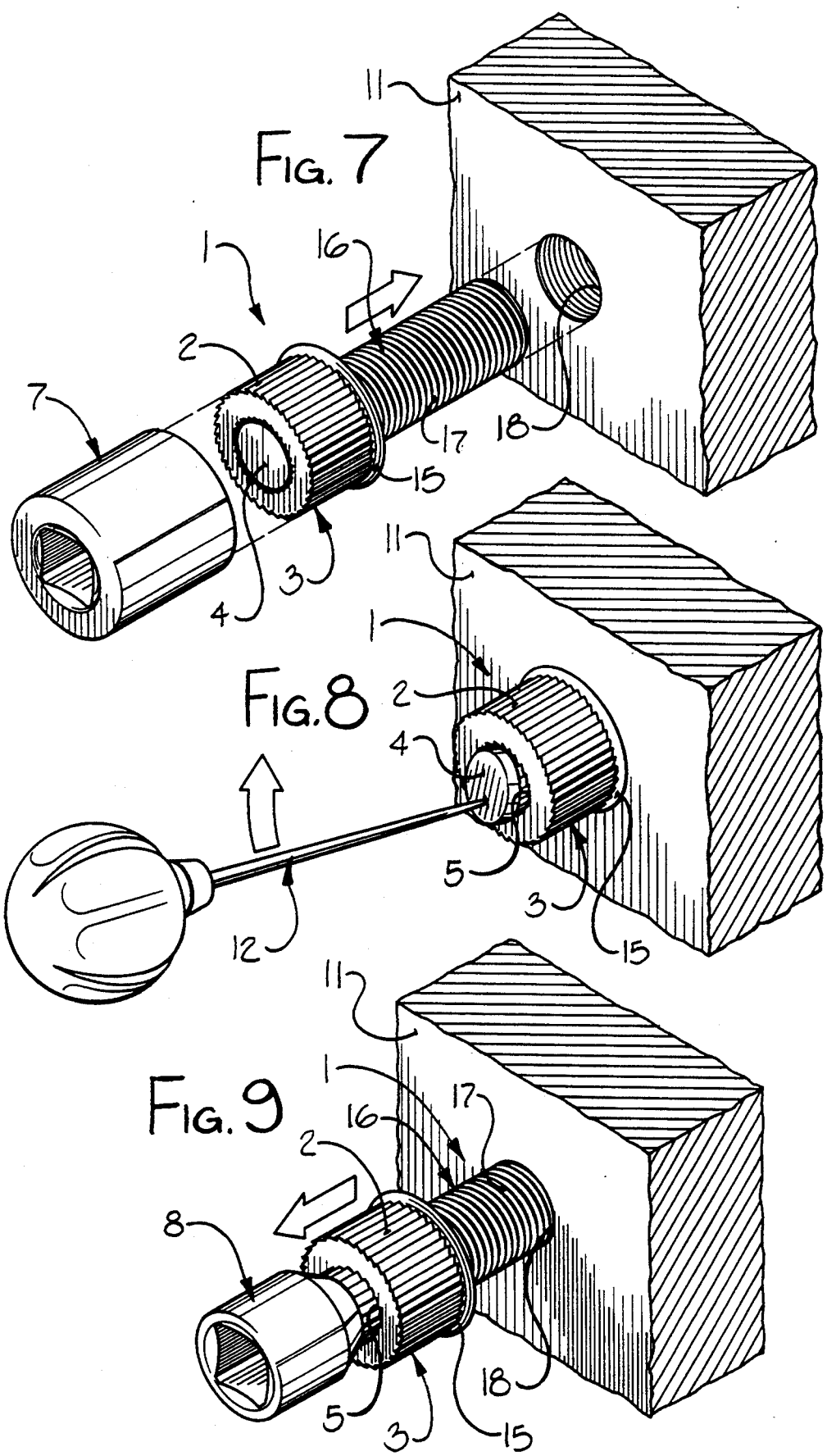

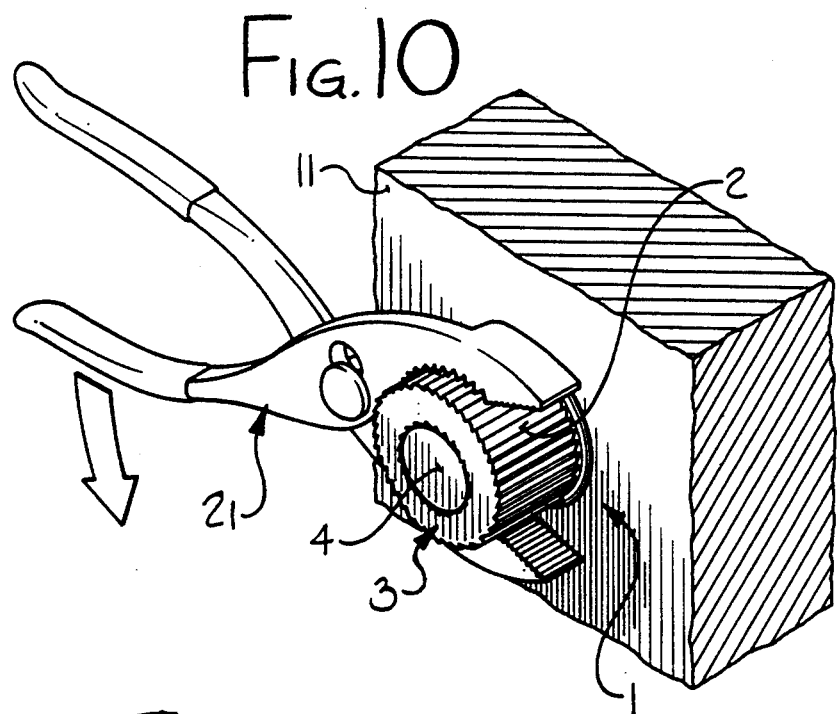
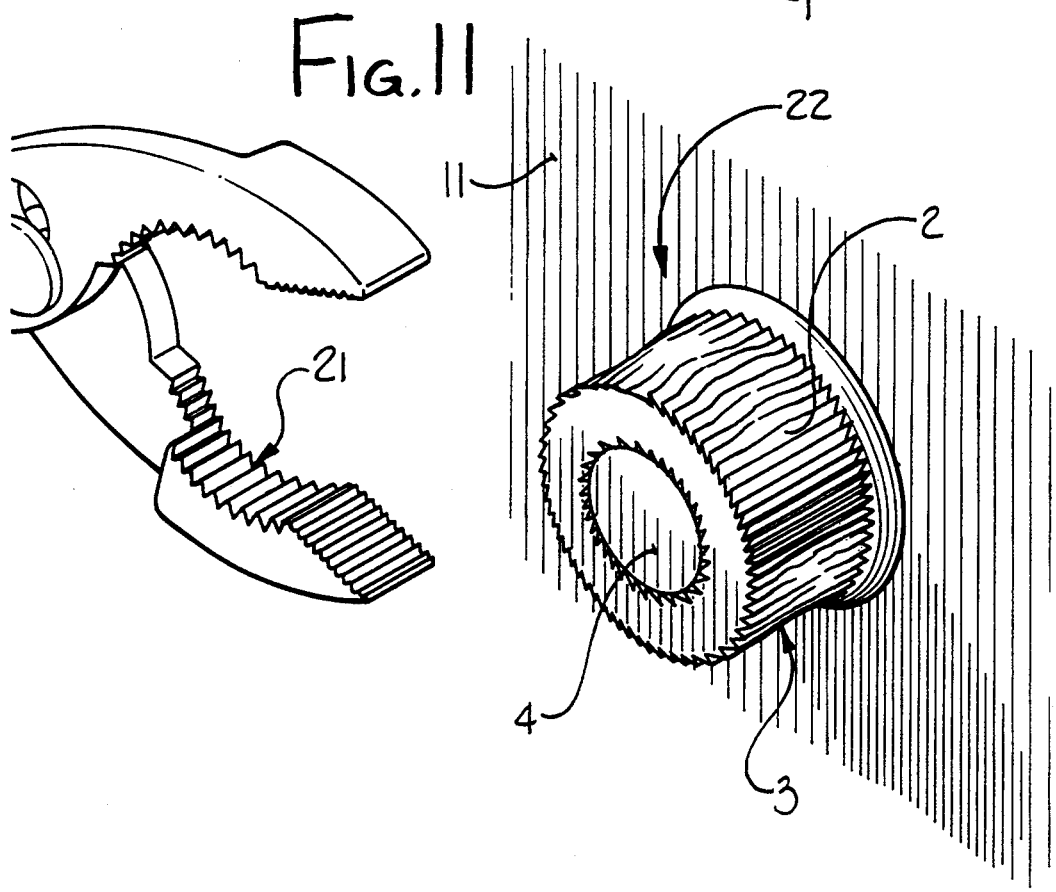

TAMPER-EVIDENT BOLT

FIELD OF THE INVENTION

The invention herein disclosed deals with fastening devices. More specifically, the invention deals with tamper-proof or tamper-evident fastening devices.

BACKGROUND OF THE INVENTION

Fastening devices, such as screws, nuts and bolts are items well known to the mechanic as well as the layman. There is hardly a household that does not have a screwdriver, pliers or a wrench for tightening or removing screws, nuts and bolts. Mechanics have an array of tools for inserting, fastening or removing fastening devices of various descriptions. There are fastening devices with a variety of heads requiring special tools for seating and removal, for example, Allen head and Phillips head screwdrivers; and, open-end and socket wrenches in a variety of sizes and shapes.

Major users of screws and bolts are vehicle manufacturers and appliance manufacturers. Machinery has developed to the extent that a great deal of sophistication is required to properly service a specific machine. Manufacturers' warranties often require that a qualified and authorized mechanic repair defective machinery, rather than an untrained lay-person. The reason for this is obvious. The lay-person trying to repair a machine or appliance may cause major damage in an attempted repair. Further, warranties often specify that only a qualified mechanic can service the appliance and a layman's attempt voids the warranty.

Another area in which tamper-proof or tamper-evident fasteners are a must, is in automobile pollution control systems. Automobiles are manufactured with set specifications for the pollution control system; including the carburetor. A layman is not allowed to change these set specifications. In many instances such a change is prohibited by law, as well as, the manufacturer's warranty.

The herein described invention besides having applicability in the area of automobile machinery and appliances; also has applicability to public telephones, vending machines, parking meters and secured storage systems. In these applications it is desired to prevent tampering with the device and to be able to detect, tampering once it has occurred.

The present invention addresses the problem of the tampered with bolt.

PRIOR ART

Various United States patents describe fasteners.

U.S. Pat. No. 2,813,450 to Dzus relates to an improved rotatable fastener. The Dzus device is an improved head portion for receiving a tool to cause rotation of the fastening device. The head portion of the Dzus device is provided with two sets of serrations. One set of serrations run in a clockwise orientation and the second set of serrations run in a counter-clockwise orientation. The orientation of the serrations aid in the respective tightening and releasing of the fastener.

Ansingh in U.S. Pat. No. 3,283,638 describes a socket head screw. The screw is advantageous because the head is designed to be able to be tightened and loosened by either one of two different types of driver tools. In the examples given, the head of the screw on the outside edge is hexagonally shaped and the top center of the head has a square indent to receive a driver tool with a square end. This head offers the advantage of being able to receive either one of two different tools to remove the screw.

Evans in U.S. Pat. No. 4,079,643 teaches a wrench and a ratcheting bolt head therefor. The wrench has a hexagonal end and an end with a pair of hexagons which will fit into indents of the bolt head for tightening and loosening.

The prior art herein cited does not disclose a tamper-evident bolt.

SUMMARY OF THE INVENTION

It is an object of this invention to make a fastening means, and specifically a screw or bolt which when unscrewed, in an unauthorized manner, from its fastening position will leave a "tell-tale" or evidence that the screw or bolt has been unscrewed. If an unauthorized person has unscrewed or attempted to unscrew the screw or bolt, this fact will be evident to authorities.

The object of this invention is accomplished by providing a "tamper-evident bolt". This "tamper-evident bolt" is a bolt with a seal or cap covering a blind axial recess or socket in the head of the bolt, preventing access to a releasing means. The bolt can be released only by removal of the seal or by the use of an unauthorized wrench or pliers applied to the outer periphery of the bolt head. In both of these methods of bolt-release, evidence of removal or a "tell-tale" will be apparent. Removal of the seal to access the socket is evidence that the bolt has been tampered with. The unauthorized wrench or pliers referred to above when applied to the outer periphery to remove the bolt will score, scratch or destroy the ratchet teeth, thus leaving evidence of tampering. In both of the instances set forth, namely seal removal, or bolt head scoring, tampering with the bolt will be evident.

The cap or seal sealing the socket or blind axial recess in the head of the bolt can be made of a soft metal such as brass or aluminum. In a specific application the cap which is made of a softer metal or material than the bolt head is pressed in, to seal the blind axial recess. Since the material from which the cap is made is softer than the ratchet teeth within the blind axial recess, the ratchet teeth will cut into and form an affective seal with the soft metal cap. In an alternative embodiment the cap can be serrated to accommodate the inner ratchet teeth. In this latter embodiment the sealing of the cap can be made more secure by the application of solder or plastic. To remove the cap or seal for access for removing the bolt, an ice pick or awl is used to pierce the cap and pop it out. In a preferred embodiment of this invention, the cap is factory installed to seal the socket and cannot be put back with other than special factory equipment, e.g. a special pressure press.

As an added feature of protection the manufacturer of the tamper-evident bolt can put serial numbers on the bolt or a color code could be added for further positive identification.

In a specific embodiment of the tamper-evident bolt, the bolt head has an outer periphery and a blind axial recess formed therein. First ratchet teeth which are parallel or at an angle relative to the axis of the bolt are formed on the outer periphery of the head, whereby a driving socket or driver having ratchet teeth corresponding to the first ratchet teeth may be placed over the outer periphery of the bolt head to seat the bolt. A second set of ratchet teeth are formed within the blind axial recess in the bolt head. The second ratchet teeth are opposite the first ratchet teeth, whereby a driver having teeth corresponding to the second ratchet teeth may be received within the blind axial recess to loosen and remove the bolt. There is a seal received within the blind axial recess, such that the seal must be removed for access to the blind axial recess, thus indicating tampering with the bolt. The seal can be disposed over the blind axial recess to be substantially flush with the bolt head. In a further embodiment, the seal can be pressed into the blind axial recess.

In an alternate embodiment of this invention, a tamper-evident bolt is described comprising a bolt head which has an outer periphery and has a blind axial recess formed therein. First ratchet teeth are formed on the outer periphery of the head, whereby a driving socket having a ratchet teeth corresponding to said first ratchet teeth may be placed over the outer periphery of the bolt head to seat the bolt. The blind axial recess in the bolt head is shaped to receive a driver corresponding to the shape of the blind axial recess and to thereby loosen and remove the bolt. A seal is received within the blind axial recess, such that the seal must be removed for access to the blind axial recess, thus indicating tampering with the bolt. The shape of the blind axial recess may be of various configurations, e.g., square or hexagonal. The important consideration for the shape of the recess is that the recess must be shaped so as to bind the driver for loosening the bolt.

The shank of the bolt can be either threaded or unthreaded. The threads of the bolt can be shaped to be received in a tapped hole or the threads can be self-tapping threads.

In a further preferred embodiment of this invention the bolt is threaded with the threads being shaped to be received into a tapped hole.

The blind axial recess in the bolt head can have a pilot stud in its center for restricting access to the bolt releasing means.

The ratchet teeth on the outer periphery in an alternative embodiment can be on an angle relative to the longitudinal axis of the bolt.

In a special embodiment of the invention the teeth on the head rather than being ratchet teeth are teeth which are in the form of splines. These splines can be orientated to be perpendicular to the top of the bolt head or the splines can be on an angle.

BRIEF DESCRIPTION OF THE DRAWINGS

FIG. 1 is an exploded perspective view showing the tamper-evident bolt and sealing cap of the disclosed invention.

FIG. 2 is an enlarged elevational view of the bolt head taken along lines 2—2, with part of the head broken away to show the detail of the inner ratchet teeth, and part of the threaded shank shortened.

FIG. 3 is an enlarged top plan view of the head of the tamper-evident bolt.

FIG. 4 is a greatly enlarged top plan view of the head with part broken away to show detail of the ratchet teeth and cap.

FIG. 7 is a view showing the bolt being inserted into a piece of equipment (only partially shown).

FIG. 8 shows the seated bolt with the cap being removed with an awl.

FIG. 9 shows the bolt being released using a ratchet teeth driver.

FIG. 10 is a view illustrating the attempted removal of the tamper evident bolt by unauthorized means.

FIG. 11 is a view illustrating the scoring of the ratchet teeth of the bolt due to the attempted, unauthorized removal of the bolt.

GENERAL DESCRIPTION OF THE PREFERRED EMBODIMENT

Figure 5:
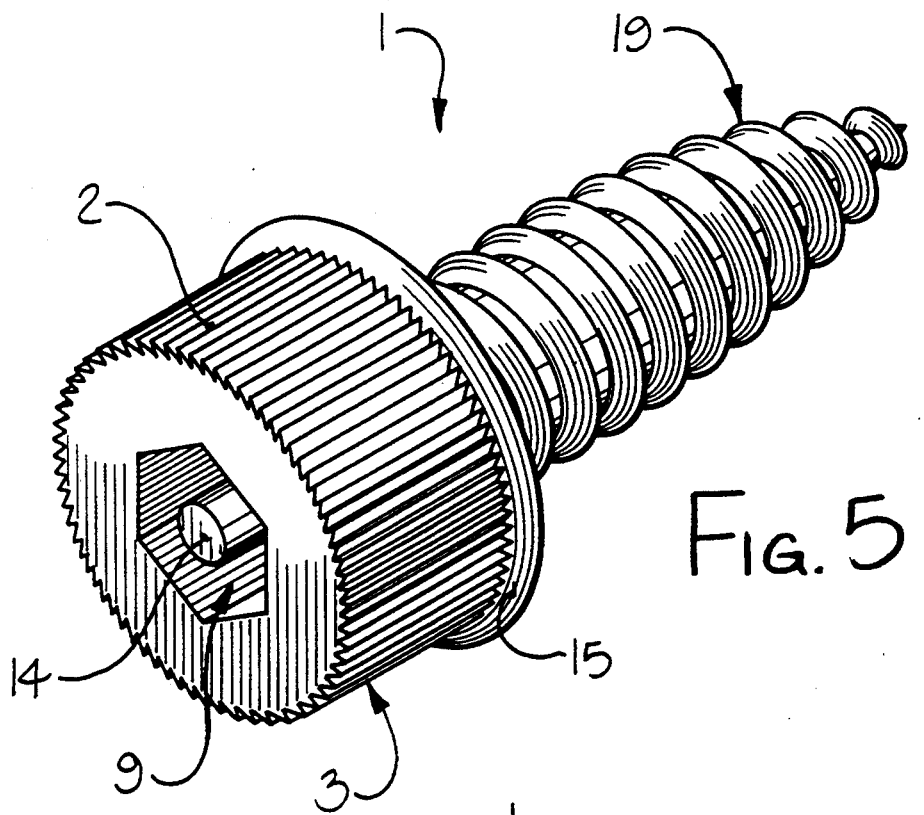
FIGS. 5 and 6 are views illustrating alternate embodiments of the tamper-evident bolt.

With reference to FIG. 1, a tamper-evident bolt 1 has ratchet teeth 2 on the outer periphery of the head 3 and a cap 4 to seal access to rachet teeth 5 in a blind axial recess (or socket) 6. It will be appreciated by those skilled in the art that while a bolt is shown it is only exemplary of other bolt-like securing devices which could be operative, as will be exemplified and described in FIGS. 5 and 6.

The ratchet teeth 2 on the outer periphery of the bolt head 3 (FIGS. 1-3) are parallel relative to the longitudinal axis of the bolt and are oriented to receive a wrench 7, with corresponding teeth, for tightening the bolt 1. The ratchet teeth 2 on the outer periphery of the head 3 of the bolt 1 can be made of a relatively soft metal or plastic to score easily and thereby readily show tampering.

Figure 12:
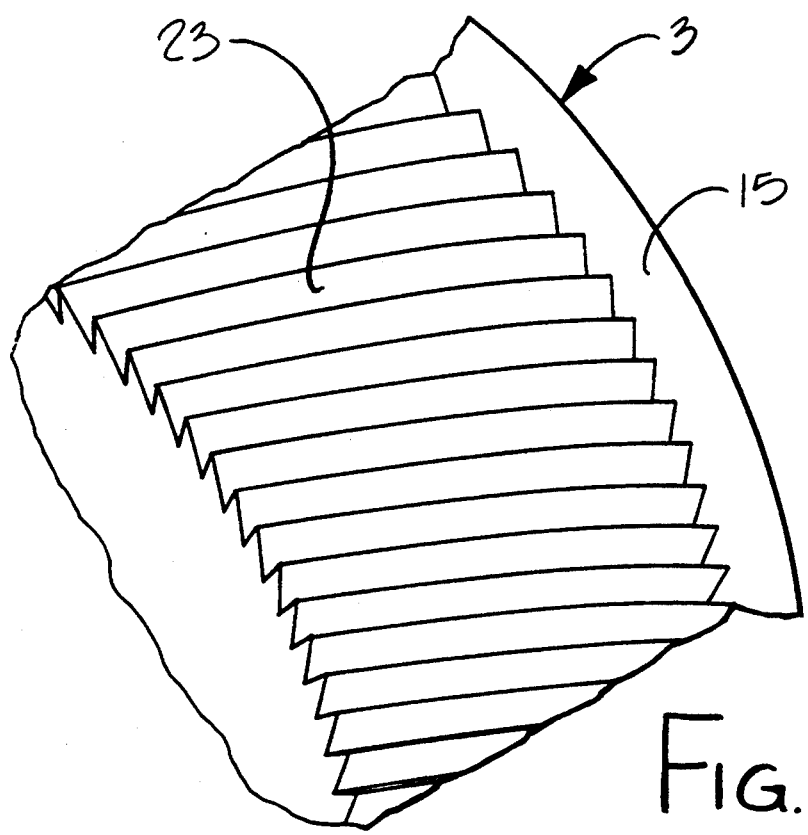
FIG. 12 is a greatly enlarged view with part of the head broken away illustrating angled ratchet teeth.

The ratchet teeth 23 can be angled (FIG. 12) and would require a unique driver for tightening the bolt.

Figure 13:
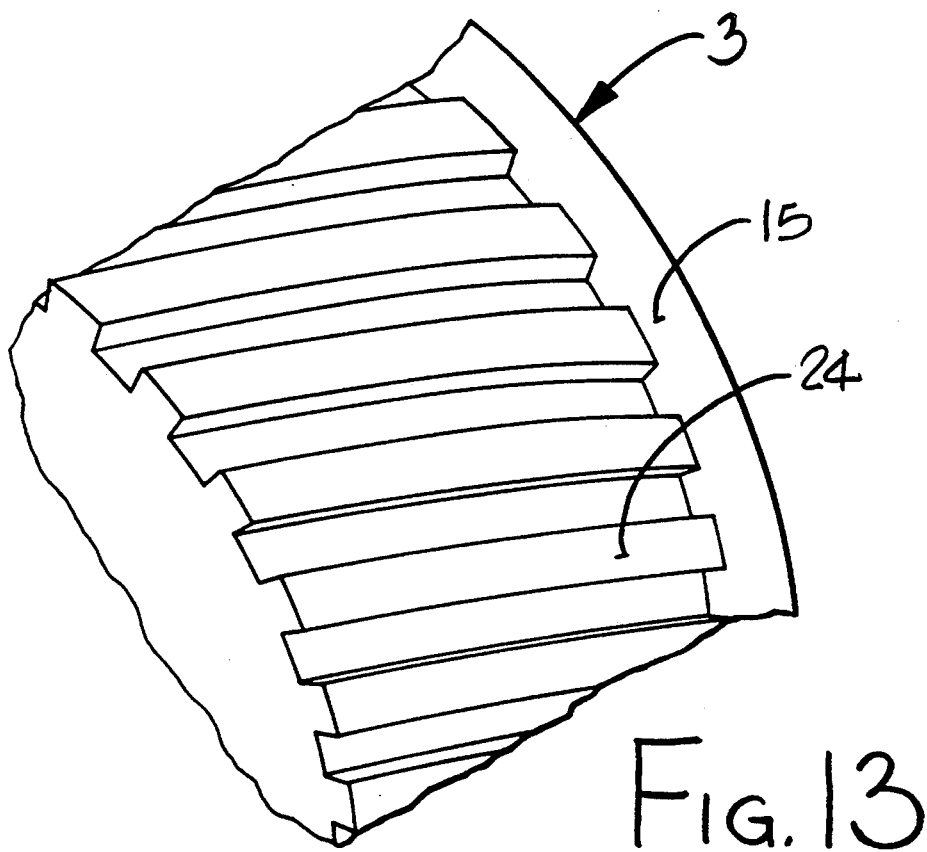
FIG. 13 is a greatly enlarged view with part of the head broken away illustrating angled spline teeth.

Instead of ratchet teeth 2 on bolt head 3 the teeth (FIG. 13) can be splined on an angle 24. There can be splined teeth 24 on the outer periphery of the bolt as well as splined teeth forming the blind axial recess 6. While angled spline teeth are described, the splines can run parallel to the longitudinal axis of the bolt.

FIGS. 3-4 show detail of the ratchet teeth 2 employed to seat the bolt 1 and ratchet teeth 5 employed to release the bolt 1. The driver socket 7 for seating the bolt 1 is partially shown in FIG. 4 and is fully shown in FIG. 7. The driver 8 for releasing the bolt is shown in FIG. 9.

Figure 6:
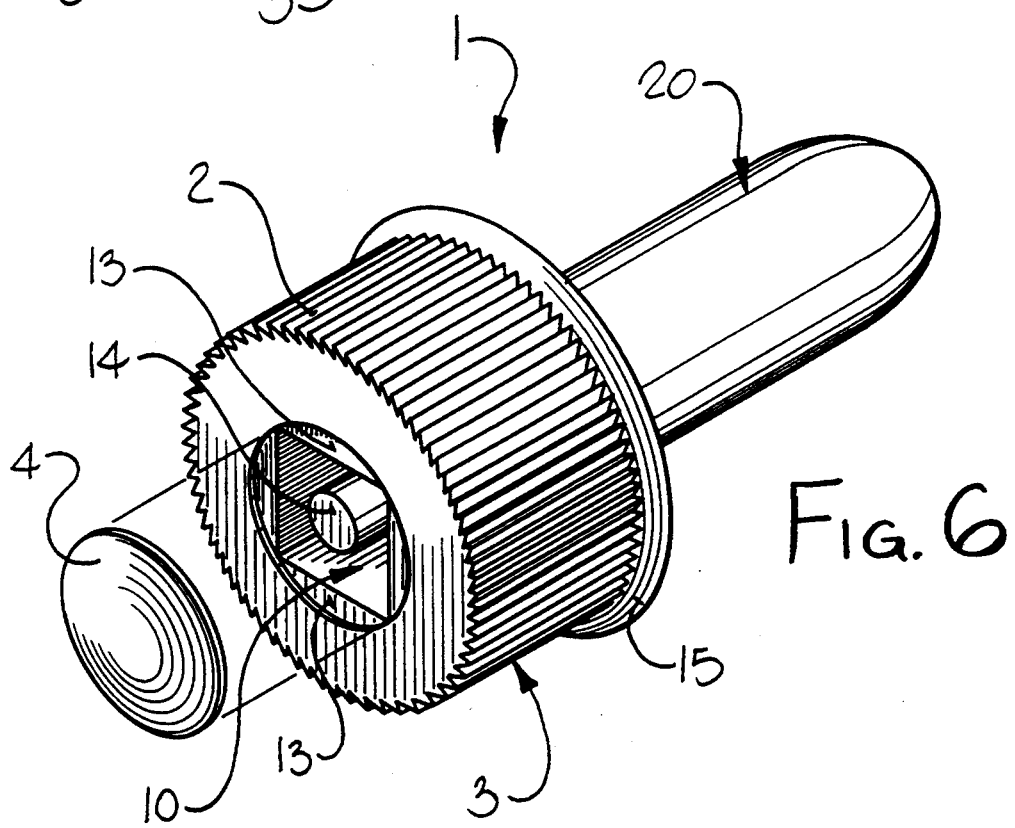

The head 3 of the bolt 1 has in its center a socket or blind axial recess 6 configured to receive a driver 8 for releasing the bolt 1. In FIGS. 1 and 9 the socket 5 is configured to receive a driver 8 with ratchet teeth. FIGS. 5 and 6 exemplify alternative configurations of the socket 6; a hexagonal socket 9 (FIG. 5) and a square socket 10 (FIG. 6). A variety of socket shapes are known to those skilled in the art and the disclosed invention should not be limited to the socket configuration shown. The shape of the socket should be such as to accept any driver.

The cap 4 in FIG. 1 is removed from the head of the bolt 3, as it would be prior to insertion to cover the blind axial recess 6. In normal use, that is when the bolt 1 is affixed, for example to a mechanical device 11 partially shown in FIGS. 7 and 8, the cap 4 will be securely attached to the head of the bolt 3 (FIGS. 2 and 7) to seal the socket 6 in the head of the bolt 3. In the embodiment shown in FIGS. 2 and 7 the cap 4 is press fitted into the socket 6, however the cap 4 could be affixed by other means, such as glue, solder or plastic. The cap 4 can be made of any number of materials such as soft metal (brass or aluminum) or plastic. It is important that the cap 4 be thin enough to be punctured by a sharp-pointed instrument, such as a pick or awl 12 (FIG. 8) for removal.

Once, the cap 4 is pressed into the blind axial recess 6 of the bolt head 3 (FIGS. 1 and 4) the soft metal of the cap 4 will take on the configuration of the ratchet teeth 5 (FIG. 4).

Bearing in mind that the inventor desires to make the tamper-evident bolt 1 as secure as possible, he envisions inserting the cap 4 by a press at the time of manufacture.

In FIG. 6 a special embodiment shows the blind axial recess 6 provided with a ledge 13 to receive the cap 4.

As an optional embodiment, a pilot stud 14 (FIGS. 1–3 and 5–6) is positioned in the blind axial recess 6 to restrict access to the socket 6 by conventionally used drivers, e.g. square or hex-sockets. A special tool (not shown) accommodating the pilot stud 14 is required to gain access to the bolt releasing socket 6. The pilot stud further restricts tampering with the seated bolt, 1. However, the tamper-evident bolt 1 is operative without such a pilot-stud 14.

The head of the bolt 3 has a shoulder 15 (FIGS. 1 and 2) which aids in the positioning of the wrench when the bolt 1 is being seated. The shoulder also provides more surface area and thereby offers a more positive closure or sealing by the bolt. A bolt without such a shoulder would be operative, but security of seating would be sacrificed.

The threaded portion 16 of the bolt 1 at the end opposite the head 3 can have threads 17 shaped so as to be received within a tapped hole 18 (FIG. 7). Alternatively, the threaded end opposite the head 3 can be pointed 19 or self-tapping 19.

In a special embodiment of this invention the bolt shank 16 instead of being threaded 15 is unthreaded 20 and made of a relatively soft material (e.g. metal or plastic) so that when it is screwed into a tapped hole 18, it will form its own thread.

The sequence of steps (FIGS. 7–9) for seating and removing the bolt involve, first applying a socket wrench whose teeth engage the ratchet teeth and seating the bolt (FIG. 7). This step should be done at the factory or by authorized personnel. The arrow (FIG. 7) indicates the direction of the bolt for insertion.

Once the bolt is seated it can be removed by piercing and removing the cap 4 (FIG. 8) with an awl 12. The arrow (FIG. 8) indicates the direction the awl 12 is moved. Bear in mind that if the cap is pierced and removed by unauthorized personnel, tampering with the bolt will be evident and the tamper-evident bolt of this invention will have served its purpose. FIG. 9 shows the bolt being removed using an authorized ratchet tool 8. The arrow (FIG. 9) shows the direction of the bolt being removed. An unauthorized removal of the bolt (FIG. 10) using pliers 21 would score the bolt 22 (FIG. 11) and indicate unauthorized use or tampering with the bolt.

The inventor recognizes that it is conceptually possible to fashion the periphery of the head of the bolt to accommodate other drivers, for example, a threaded periphery or one accommodating a spanner. The outer periphery could have spikes or other "tell-tale" signs of tampering. The outstanding advantage of the herein disclosed tamper-evident bolt is that the ratchet teeth serve the dual function of enabling the bolt to be seated, as well as, being easily scored or broken if the bolt is tampered with in an unauthorized way.

The tamper-evident bolt of this invention in use will present many benefits. It will benefit manufacturers of heavy equipment, such as, motors and diesel engines. Under warranty considerations manufacturers will know if there has been any unauthorized servicing of the equipment. The "tamper-evident bolt" will immediately show unauthorized tampering and a breach of warranty. Automobile manufacturers set and seal carburetors and pollution control devices at the factory. The removal of the cap or scoring of outer teeth of the bolt will indicate tampering with the carburetor or pollution control devices. Removal of the cap or scoring of the outer teeth of the bolt in coin-operated devices, such as telephones or parking meters will indicate tampering. Thus, it is clear that the tamper-evident bolt of this invention will be of great benefit to machine and appliance manufacturers.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A tamper-evident bolt comprising a bolt head having an outer periphery and further having a blind axial recess formed therein, first ratchet teeth are formed on the outer periphery of the head, whereby a driving socket having ratchet teeth corresponding to the first ratchet teeth may be placed over the outer periphery of the bolt head to seat the bolt, second ratchet teeth are formed within the periphery of the blind axial recess of the bolt head, whereby a driver having teeth corresponding to the second ratchet teeth may be received within the blind axial recess to loosen and remove the bolt, and a seal received within and covering the blind axial recess, such that the seal must be removed for access to the blind axial recess, thereby indicating tampering with the bolt.

2. The tamper-evident bolt of claim 1, wherein the seal is disposed substantially flush with the bolt head.

3. The tamper-evident bolt of claim 1, wherein the seal has been pressed into the blind axial recess.

4. The tamper-evident bolt of claim 1, wherein the bolt is a threaded bolt.

5. The tamper-evident bolt of claim 4, wherein the threads of the bolt opposite the bolt head are shaped to be received within a tapped hole.

6. The tamper-evident bolt of claim 4, wherein the threads of the bolt opposite the bolt head are self-tapping threads.

7. The tamper-evident bolt of claim 1, wherein the bolt has an unthreaded shank.

8. The tamper-evident bolt of claim 1, wherein the blind axial recess has a pilot stud in its center.

9. The tamper-evident bolt of claim 1, wherein the ratchet teeth run parallel to the longitudinal axis of the bolt.

10. The tamper-evident bolt of claim 1, wherein the ratchet teeth are at an angle relative to the longitudinal axis of the bolt.

11. A tamper-evident bolt comprising the bolt head having an outer periphery and further having a blind axial recess formed therein, ratchet teeth are formed on the outer periphery of the head, whereby a driving socket having ratchet teeth corresponding to the ratchet teeth may be placed over the outer periphery of the bolt head to seat the bolt, a blind axial recess in the bolt head being shaped to receive a driver having a shape corresponding to the shape of the blind axial recess such that the driver received within the blind axial recess may loosen and remove the bolt, and a seal received within the blind axial recess, such that the seal must be removed for access to the blind axial recess, thereby indicating tampering with the bolt.

12. The tamper-evident bolt of claim 11, wherein the seal is disposed substantially flush with the bolt head.

13. The tamper-evident bolt of claim 11, wherein the seal has been pressed into the blind recess axial recess.

14. The tamper-evident bolt of claim 11, wherein the blind axial recess is shaped with ratchet teeth to receive a driver with corresponding ratchet teeth.

15. The tamper-evident bolt of claim 11, wherein the blind axial recess is hexagonal.

16. The tamper-evident bolt of claim 11, wherein the blind axial recess is square shaped.

17. The tamper-evident bolt of claim 11, wherein the bolt is provided with threads adapted to be received in a tapped hole.

18. The tamper-evident bolt of claim 11, wherein the bolt is provided with self-tapping threads.

19. The tamper-evident bolt of claim 11, wherein the bolt has an unthreaded shank.

20. The tamper-evident bolt of claim 11, wherein the blind axial recess has a pilot stud in its center.

21. The tamper-evident bolt of claim 11, wherein the ratchet teeth run parallel to the longitudinal axis of the bolt.

22. The tamper-evident bolt of claim 11, wherein the ratchet teeth are at an angle relative to the longitudinal axis of the bolt.

23. A tamper-evident bolt comprising the bolt head having an outer periphery and further having a blind axial recess formed therein, splined teeth are formed on the outer periphery of the head, whereby a driving socket having splined teeth corresponding to the ratchet teeth may be placed over the outer periphery of the bolt head to seat the bolt, a blind axial recess in the bolt head being shaped to receive a driver having a shape corresponding to the shape of the blind axial recess such that the driver received within the blind axial recess may loosen and remove the bolt, and a seal received within the blind axial recess, such that the seal must be removed for access to the blind axial recess, thereby indicating tampering with the bolt.

24. The tamper-evident bolt of claim 23, wherein the splined teeth on the outer periphery are at an angle relative to the longitudinal axis of the bolt.

25. The tamper-evident bolt of claim 23, wherein the splined teeth on the outer periphery are parallel relative to the longitudinal axis of the bolt.

* * * * *